Nov. 4, 1969     W. T. RENTSCHLER ET AL     3,476,030
PHOTOGRAPHIC CAMERA WITH INTERLENS SHUTTER
Filed March 24, 1966

INVENTORS
Waldemar T. Rentschler
Dieter Rittmann
BY
Arthur A. March
ATTORNEY

United States Patent Office 3,476,030
Patented Nov. 4, 1969

3,476,030
PHOTOGRAPHIC CAMERA WITH INTERLENS SHUTTER
Waldemar T. Rentschler and Dieter Rittmann, Calmbach, Black Forest, Germany, assignors to Prontor-Werk Alfred Gauthier, G.m.b.H., Calmbach, Black Forest, Germany, a corporation of Germany
Filed Mar. 24, 1966, Ser. No. 537,237
Claims priority, application Germany, Mar. 31, 1965, P 36,425
Int. Cl. G03b 9/00; G01j 1/00, 1/52
U.S. Cl. 95—53                                   3 Claims

ABSTRACT OF THE DISCLOSURE

A photographic camera is provided that has an interlens shutter and a timing circuit situated in the shutter housing; a supporting plate is provided which contains the electrical elements associated with the timing circuit. The elements are premounted on the plate and the plate is installable in the shutter housing as an independent structural unit.

---

The present invention relates to a photographic camera having an interlens shutter and a timing circuit situated within the shutter housing.

The object of the present invention is to simplify the assembly of an interlens shutter of the aforementioned species through improved mounting arrangements of the structural elements to be located in the shutter housing.

In conformance with this object, the present invention provides that the essential structural elements of the timing circuit, such as transistors, resistors, capacitor, and potentiometer, be premounted on a supporting plate. The resulting supporting plate is installed into the shutter housing as a complete structural unit. This arrangement provides favorable technical production conditions which make it possible to circumvent the difficulties which arise when directly installing elements associated with the electronic timing circuit, in the shutter housing. These difficulties stem mainly from the solderings of the often fine interconnecting wires. In general, these solderings have to be carried out after the elements have been installed in the shutter housing.

The invention further provides that the supporting plate be adapted to the annular shape of the shutter housing. The supporting plate is also provided with projections, plug bores and recesses. The purpose of this design is to bring about an extremely compact arrangement of the structural unit of the invention so as to require minimum space for installation.

The individual resistors of the timing circuit are mounted separately in the shutter housing so as to assure safe mutual insulation, on the one hand, and require as little space as possible, on the other. In this connection, the invention provides that the projection of the supporting plate be in the form of a web, and comprise two rows of radially directed plug bores adapted to receive the resistors. These plug bores are located opposite each other in a staggered relationship. The above-mentioned advantages related to the technical production of the unit can be further increased by making the supporting plate of a plastic material. The plastic unit may, for example, be produced by the injection molding process.

Other advantages of the invention appear in the following description and specification accompanied by drawings in which.

Figures 1, 2:
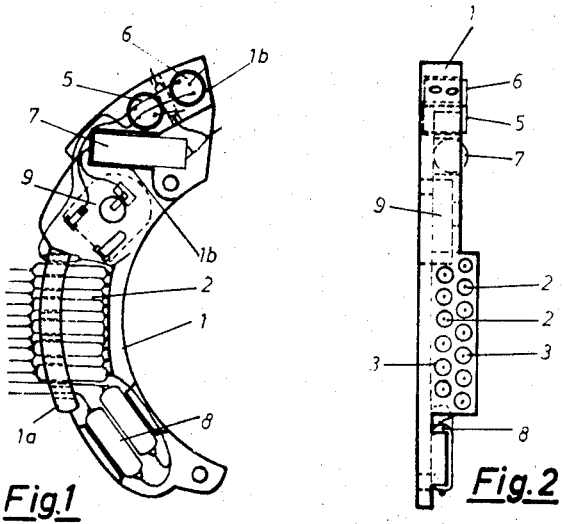
FIG. 1 shows the supporting plate provided with the essential structural elements of a timing circuit.
FIG. 2 shows a side view of the supporting plate.

In accordance with the drawing, the supporting plate 1 is adapted to the annular shape of the housing of an inter-lens shutter. The supporting plate serves to receive several structural elements of an electronic timing circuit for photographic cameras. In this connection, the supporting plate 1 has a projection 1a in the form of a web for the purpose of supporting a number of resistors 2 associated with the timing circuit. As apparent from FIG. 2, the web 1a is provided with a plurality of plug bores 3 arranged in two rows and extending in radial direction.

In order to accommodate the resistors 2 within a narrowly limited space, the two rows are arranged in a staggered relationship. The distance between the two rows is such that the insulation of the individual resistors assures proper functioning. Several recesses 1b provided in the supporting plate 1, are designed to receive two transistors 5 and 6 as well as a capacitor 7. Resistors 8, which are also provided for exposure timing circuit, are situated immediately adjacent to resistors 2. Resistors 8, transistors 5 and 6, and capacitor 7, are mounted to the supporting plate from the top, with reference to the view shown in FIG. 1. A potentiometer 9, on the other hand, may be inserted in a recess provided on the underside of the supporting plate 1. The aforementioned structural elements require no special fastening devices, since the electrical wires interconnecting the individual elements provide sufficient support for the entire system mounted on the supporting plate. However, in order to provide for additional margins of safety, the preceding structural elements can also be cemented to the supporting plate 1.

Figure 3:
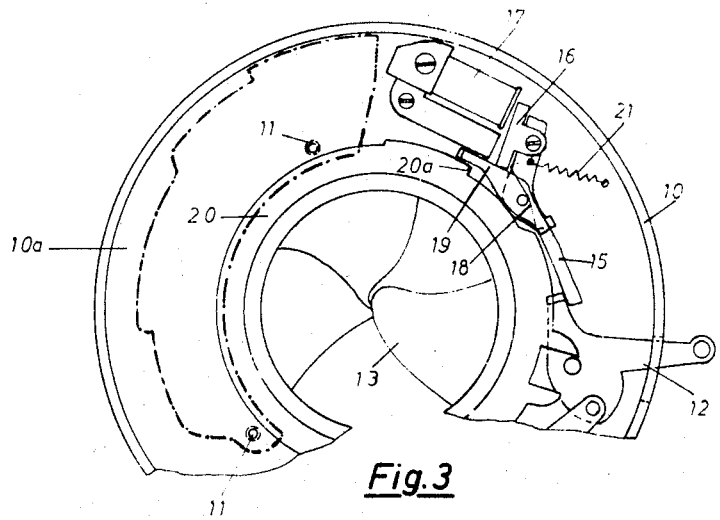
FIG. 3 is a top view of the housing of an electronically controlled interlens shutter, and shows the supporting plate with the elements of the timing circuit, indicated by dash-dot lines.

When all of these circuit elements are fixed to the supporting plate 1, the latter may be installed into the housing 10 of an interlens shutter illustrated in FIG. 3. The assembled supporting plate is thus a finished premounted structural unit, and may be secured to the bottom 10a of the housing 10, by means of screws 11. As already indicated, the structural assembly outlined by dash-dot lines serves to control a shutter blade driving mechanism. This mechanism shown in the drawing for reference purposes only, comprises a lever 12, by means of which the mechanism bringing about the opening and closing motion of the shutter blades 13, can be conveyed into cocked position and then released at the end of the cocking process. Cooperating with the cocking and the release lever 12, is a two-armed lever 15 which carries an armature 16. Due to the rotary motion imparted to the lever 15 during the cocking and release process of the shutter, the armature 16 is brought into engagement with electromagnet 17. The latter retains the armature for the period of time determined by the timing circuit, after the release of the shutter.

An arresting lever 19, positioned coaxially with lever 15, is kept in engagement with the latter, by means of a coil spring 18. The arresting lever 19 cooperates with the ring 20 which serves to drive the shutter blades 13. Thus, the free end of the lever 19 engages the radially projecting edge 20a of shutter blade ring 20, in response to the motion of the lever 15 due to the action of coil spring 18. If the shutter blade ring 20 executes a counterclockwise rotary motion to initiate the opening of shutter blades 13, then, at the end of this motion of ring 20, the arresting lever 19 moves in front of the edge 20a and blocks the latter. Lever 19 remains in this position until the electromagnet 17 releases the armature 16. When released, armature 16 returns again to the initial position due to the action of restoring spring 21. In returning, lever 15 takes along the arresting lever 19. When the blocking device releases the shutter blade ring 20, the latter executes a clockwise rotary motion. The resulting effect is that the shutter blades 13 transfer again to the closing position.

What is claimed is:

1. A photographic camera having an interlens shutter and a timing circuit situated in the shutter housing including a supporting plate containing the electrical elements associated with said timing circuit, said elements being premounted on said plate and said plate being installable into said shutter housing as an independent structural unit, said electrical components comprising transistors, resistors, a capacitor, and a potentiometer, said supporting plate being adapted to the annular shape of said shutter housing and provided with projections, plug bores and recesses for retaining said electrical elements, said supporting plate having a projection in the form of a web, said web having a plurality of plug bores extending in a radial direction to receive a plurality of resistors for the timing circuit.

2. The photographic camera of claim 1 wherein said projection of said supporting plate is in form of a web comprising two rows of radially directed plug bores adapted to retain resistors.

3. The photographic camera of claim 1 wherein said plug bores are situated in a staggered relationship with respect to one another.

References Cited

UNITED STATES PATENTS 2,978,970   4/1961   Fahlenberg.
3,040,643   6/1962   Rentschler.
3,085,486   4/1963   Bushman.

FOREIGN PATENTS 1,365,652   5/1964   France.

JOHN M. HORAN, Primary Examiner

U.S. Cl. X.R.
95—10